(12) United States Patent
Marinier et al.

(10) Patent No.: US 8,780,750 B2
(45) Date of Patent: Jul. 15, 2014

(54) METHOD AND APPARATUS FOR REPORTING A BUFFER STATUS

(75) Inventors: Paul Marinier, Brossard (CA); Diana Pani, Montreal (CA); Christopher R. Cave, Montreal (CA); Stephen E. Terry, Northport, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 148 days.

(21) Appl. No.: 13/372,031

(22) Filed: Feb. 13, 2012

(65) Prior Publication Data

US 2012/0147771 A1 Jun. 14, 2012

Related U.S. Application Data

(63) Continuation of application No. 12/537,714, filed on Aug. 7, 2009, now Pat. No. 8,116,274.

(60) Provisional application No. 61/087,424, filed on Aug. 8, 2008.

(51) Int. Cl.
*G01R 31/08* (2006.01)

(52) U.S. Cl.
USPC .......................................... 370/252; 370/329

(58) Field of Classification Search
None
See application file for complete search history.

(56) References Cited

U.S. PATENT DOCUMENTS

| | | | |
|---|---|---|---|
| 7,158,504 B2 | 1/2007 | Kadaba et al. | |
| 8,027,698 B2 | 9/2011 | Niwano et al. | |
| 2006/0274690 A1 | 12/2006 | Chun et al. | |
| 2008/0026738 A1 | 1/2008 | Jiang | |
| 2008/0045255 A1 | 2/2008 | Revel et al. | |
| 2008/0049669 A1* | 2/2008 | Lundby et al. | 370/329 |

FOREIGN PATENT DOCUMENTS

| | | |
|---|---|---|
| CN | 101222303 A | 7/2008 |
| EP | 1 883 190 | 1/2008 |

OTHER PUBLICATIONS

Third Generation Partnership Project, "Technical Specification Group Radio Access Network; Medium Access Control (MAC) Protocol Specification (Release 7)," 3GPP TS 25.321 v7.10.1 (Sep. 2008).

Third Generation Partnership Project, "Technical Specification Group Radio Access Network; Medium Access Control (MAC) Protocol Specification (Release 7)," 3GPP TS 25.321 v7.13.0 (Jun. 2009).

Third Generation Partnership Project, "Technical Specification Group Radio Access Network; Medium Access Control (MAC) Protocol Specification (Release 8)," 3GPP TS 25.321 v8.2.0 (May 2008).

Third Generation Partnership Project, "Technical Specification Group Radio Access Network; Medium Access Control (MAC) Protocol Specification (Release 8)," 3GPP TS 25.321 v8.3.0 (Sep. 2008).

(Continued)

*Primary Examiner* — David Oveissi
(74) *Attorney, Agent, or Firm* — Volpe and Koenig, P.C.

(57) ABSTRACT

A wireless transmit/receive unit (WTRU) reports a buffer status as part of scheduling information for enhanced dedicated channel (E-DCH) transmissions. For reporting the buffer status, the WTRU calculates a total amount of data available across all logical channels for which reporting is requested by a radio resource control (RRC) entity. The total amount of data includes an amount of data that is available for transmission and retransmission at a radio link control (RLC) entity and an amount of data that is available for transmission in a medium access control for enhanced dedicated channel (MAC-i/is) segmentation entity in case that a MAC-i/is entity is configured. The WTRU sends scheduling information including a total E-DCH buffer status (TEBS) field that is set based on the total amount of data.

18 Claims, 3 Drawing Sheets

(56) References Cited

OTHER PUBLICATIONS

Third Generation Partnership Project, "Technical Specification Group Radio Access Network; Medium Access Control (MAC) Protocol Specification (Release 8)," 3GPP TS 25.321 v8.6.0 (Jun. 2009).

Interdigital, "TEBS Definition Update for MAC-i/is", Change Request 0432, 3GPP TSG-WG2#62bis, R2-084666, (Jeju, South Korea, Aug. 18-22, 2008).

Ericsson, et al., "New Work Item Proposal: Improved L2 for Uplink", 3GPP TSG RAN Meeting #37, Agenda Item 9.27, RP-070717, (Riga, Latvia; Sep. 11-14, 2007).

Nokia Corporation et al., "Enhanced Uplink for CELL_FACH in 25.321," 3GPP TSG-RAN WG2 Meeting #61, R2-081774 (Mar. 31-Apr. 4, 2008).

Interdigital, "Happy Bit Setting with Improved L2 for UL," 3GPP TSG-WG2 Meeting #62bis, R2-083374 (Jun. 30-Jul. 4, 2008).

Third Generation Partnership Project, "Technical Specification Group Radio Access Network; Medium Access Control (MAC) Protocol Specification (Release 7)," 3GPP TS 25.321 v7.10.0 (Sep. 2008).

* cited by examiner

METHOD AND APPARATUS FOR REPORTING A BUFFER STATUS

CROSS REFERENCE TO RELATED APPLICATIONS

This application is a continuation of U.S. patent application Ser. No. 12/537,714, filed on Aug. 7, 2009, which claims the benefit of U.S. Provisional Patent Application Ser. No. 61/087,424 filed Aug. 8, 2008, the contents of which are hereby incorporated by reference herein.

FIELD OF INVENTION

This application is related to wireless communications.

BACKGROUND

Enhancements to layer 2 (L2) protocols, (i.e., medium access control (MAC) and radio link control (RLC)), for the high speed uplink packet access (HSUPA) have been introduced into the third generation partnership project (3GPP) Release 8. These enhancements allow better support of high data rates by introducing flexible RLC protocol data unit (PDU) sizes along with segmentation capabilities at the MAC layer of the wireless transmit/receive unit (WTRU). MAC-i/is sub-layer, (MAC entity for handling enhanced dedicated channel (E-DCH)), includes a segmentation entity per logical channel identity. If a dedicated channel MAC (MAC-d) PDU or a common channel MAC (MAC-c) PDU does not fit into the available transport block space, the MAC-i/is entity segments the MAC-d or MAC-c PDU and stores the remaining segment in the segmentation entity.

Since the introduction of the HSUPA in the 3GPP Release 6, mechanisms have been introduced to help the Node B scheduler assess the uplink data rate that the WTRU requires and assist the Node B to get a better view of the amount of system resources needed by the WTRU and the amount of resources the Node B can actually make use of. One of these mechanisms is scheduling information (SI) that may be included into a MAC-e or MAC-i PDU. The scheduling information includes a total E-DCH buffer status (TEBS) field which identifies the amount of data in number of bytes that is available for transmission and retransmission in the RLC layer. The scheduling information also indicates a highest priority logical channel (HLID) with available data, the highest priority logical channel buffer status (HLBS), and the UE power headroom (UPH). The total length of the scheduling information is 18 bits for frequency division duplex (FDD). For time division duplex (TDD) the scheduling information further includes a field to assist the Node B with estimation of the degree of inter-cell interference a WTRU will generate.

The scheduling information reporting is triggered according to a number of different triggering mechanisms that are dependent on the value of the serving grant and the TEBS. The scheduling information reporting is triggered if the serving grant is equal to "zero" or all HARQ processes are deactivated, and the TEBS becomes larger than zero. The scheduling information reporting may be triggered periodically, which is configured by RRC. Two different periodic triggers, (i.e., timers), may be configured for two cases. In the case where the serving grant is zero or all processes are deactivated, and TEBS is larger than zero, T_SING is the timer that determines the periodicity of the triggering. In the case where the serving grant is not zero and at least one process is activated, T_SIG is the timer that determines the periodicity of the triggering. The scheduling information reporting may be triggered if the serving grant becomes too small to allow transmission of a single PDU from any scheduled MAC-d flow and TEBS becomes larger than zero. The scheduling information reporting may be triggered if an E-DCH serving cell change occurs and the new E-DCH serving cell was not part of the previous serving E-DCH radio link set (RLS). The scheduling information is not transmitted if TEBS is zero, even if it is triggered by one of the configured triggering mechanisms.

A happy bit is an additional mechanism that allows the Node B to know whether the WTRU is happy with the current grant and resources allocated to the WTRU. The happy bit is a single bit field that is passed from the MAC entity to the physical layer for inclusion on an E-DCH dedicated physical control channel (E-DPCCH). The happy bit may be set to either "happy" or "not happy." "Happy" indicates that the WTRU could use more resources, and "not happy" indicates that the WTRU could not use more resources. The setting of the happy bit is also based on the TEBS.

One of the conditions to set the happy bit to "not happy" is if the TEBS would require more than Happy_bit_delay condition ms to be transmitted with the current serving grant×the ratio of active HARQ processes to the total number of HARQ processes.

According to the current 3GPP specifications, the TEBS sent as part of the scheduling information only indicates the total amount of data in bytes that is available across all logical channels that are available for transmission and retransmission in the RLC layer. However, with the introduction of segmentation capabilities in the MAC entity, (i.e., MAC-i/is entity), the MAC entity may have one or more segments stored in the segmentation entity. The total number of bytes waiting in the MAC-i/is segmentation entity is not included in the TEBS calculation. Due to the fact that the introduction of flexible RLC PDUs allows the RLC entity to create RLC PDUs of a size up to the maximum RLC PDU size, the number of bits stored in the segmentation entity could be relatively high. Therefore, by not including the amount of data stored in the MAC layer segmentation entity, the WTRU reports an incorrect TEBS. Since the WTRU requires additional resources to transmit the segments stored in the MAC layer segmentation entity, by not reporting them, the network will obtain an incorrect view of the number of resources required by the WTRU.

Additionally, where the network decreases the grant of the WTRU to zero the WTRU may still have some data in the MAC layer segmentation entity to transmit. The current scheduling information triggering mechanisms allow the WTRU to send the scheduling information if the TEBS becomes larger than zero and the serving grant is zero. However, if TEBS is zero but the WTRU has some remaining data in the MAC layer segmentation entity, the WTRU transmission will stall in that situation. The triggering criteria will not allow the WTRU to send a TEBS and thus the network will not know that the WTRU requires additional resources to successfully complete the transmission of the data in its buffer. This will delay transmission and prevent the WTRU from completing transmission of the data.

The setting of the happy bit is also dependent on the TEBS. If TEBS is zero or if TEBS is incorrectly set and the WTRU has one or more MAC segments in the MAC layer segmentation entity, the WTRU will not set the happy bit properly. Due to the fact that the TEBS is underestimated, the WTRU might calculate that the WTRU is able to transmit the data within the delay restrictions. However, if the data contained in the MAC layer was taken into consideration the WTRU may not be able to satisfy the delay criteria.

SUMMARY

A WTRU reports a buffer status as part of scheduling information for E-DCH transmissions. For reporting the buffer status, the WTRU calculates a total amount of data available across all logical channels for which reporting is requested by a radio resource control (RRC) entity. The total amount of data includes an amount of data that is available for transmission and retransmission at an RLC entity and an amount of data that is available for transmission in a MAC-i/is segmentation entity in case that a MAC-i/is entity is configured. The WTRU sends scheduling information including a TEBS field that is set based on the total amount of data.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "WTRU" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "Node B" includes but is not limited to a base station, a site controller, an access point (AP), or any other type of interfacing device capable of operating in a wireless environment. The terminologies "MAC-is/i" and "MAC-i/is" may be used interchangeably.

Figure 1:
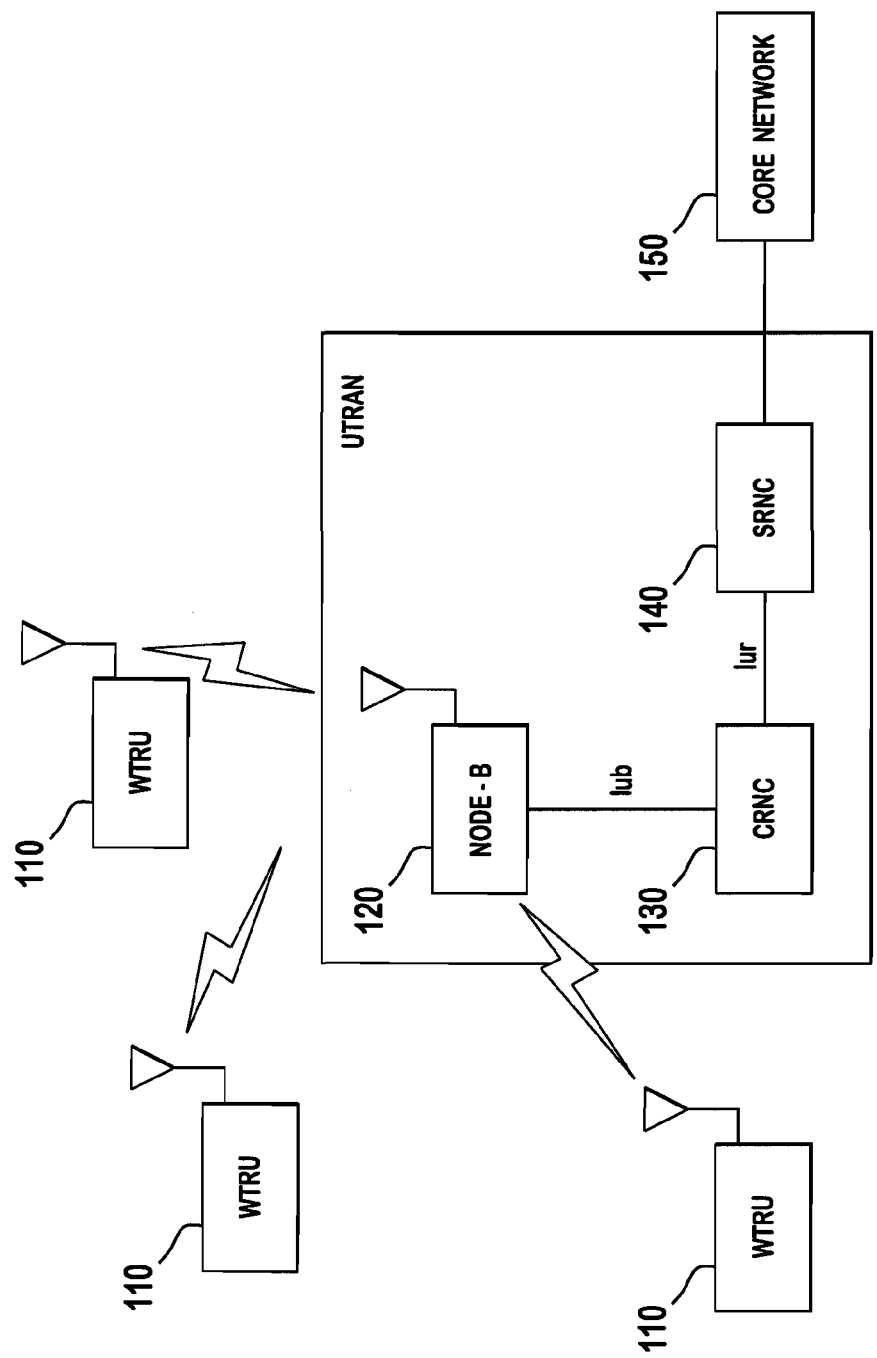
FIG. 1 shows a wireless communication system.

FIG. 1 shows a wireless communication system 100 including a plurality of WTRUs 110, a Node B 120, a controlling radio network controller (CRNC) 130, a serving radio network controller (SRNC) 140, and a core network 150. The Node B 120 and the CRNC 130 may collectively be referred to as the universal terrestrial radio access network (UTRAN).

As shown in FIG. 1, the WTRUs 110 are in communication with the Node B 120, which is in communication with the CRNC 130 and the SRNC 140. Although three WTRUs 110, one Node B 120, one CRNC 130, and one SRNC 140 are shown in FIG. 1, it should be noted that any combination of wireless and wired devices may be included in the wireless communication system 100.

Figure 2:
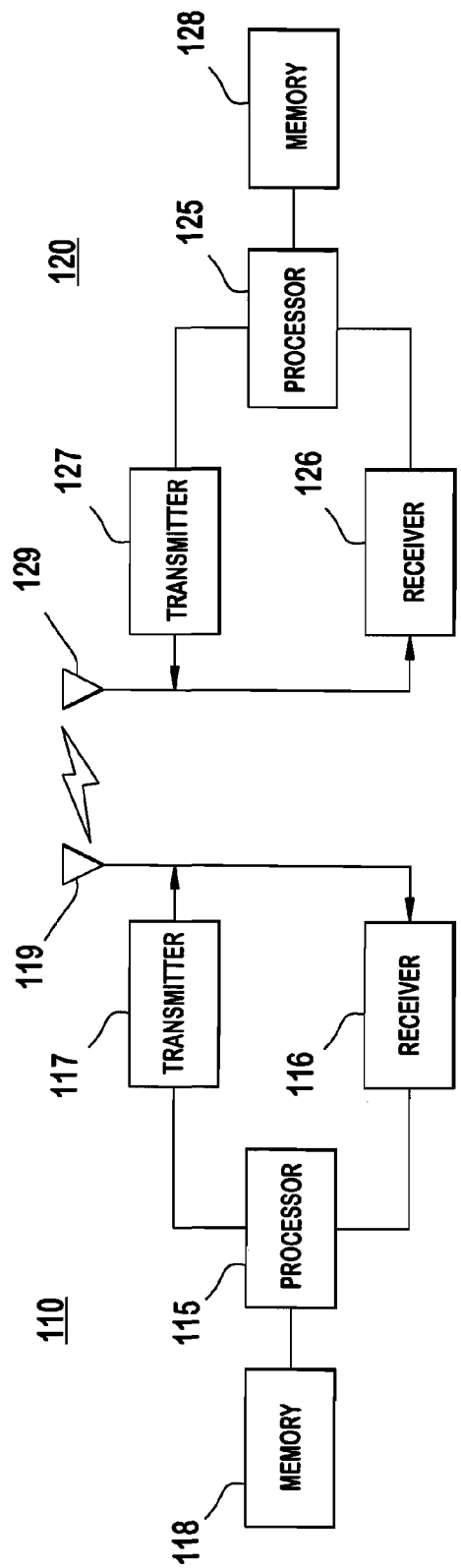
FIG. 2 is a functional block diagram of a WTRU and the Node-B of the wireless communication system of FIG. 1.

FIG. 2 is a functional block diagram of a WTRU 110 and the Node B 120 of the wireless communication system 100 of FIG. 1. As shown in FIG. 2, the WTRU 110 is in communication with the Node B 120 and both are configured to perform a method of reporting a buffer status.

In addition to the components that may be found in a typical WTRU, the WTRU 110 includes a processor 115, a receiver 116, a transmitter 117, a memory 118, and an antenna 119. The memory 118 is provided to store software including operating system, application, etc. The processor 115 is provided to perform, alone or in association with the software, a method of reporting a buffer status in accordance with embodiments disclosed below. For example, the processor 115 is configured to calculate a total amount of data available across all logical channels for which reporting is requested, including an amount of data that is available for transmission and retransmission at an RLC entity and an amount of data that is available for transmission in a segmentation entity of a medium access control sub-layer for enhanced dedicated channel (MAC-i/is), and send scheduling information including a TEBS field that is set based on the total amount of data. The receiver 116 and the transmitter 117 are in communication with the processor 115. The antenna 119 is in communication with both the receiver 116 and the transmitter 117 to facilitate the transmission and reception of wireless data.

In addition to the components that may be found in a typical base station, the Node B 120 includes a processor 125, a receiver 126, a transmitter 127, a memory 128, and an antenna 129. The processor 125 is configured to support a method of reporting a buffer status in accordance with any embodiments disclosed below. The receiver 126 and the transmitter 127 are in communication with the processor 125. The antenna 129 is in communication with both the receiver 126 and the transmitter 127 to facilitate the transmission and reception of wireless data.

In accordance with a first embodiment, the definition of TEBS is modified such that the TEBS field identifies the total amount of data available across all logical channels (including data stored in the RLC and MAC-i/is) for which reporting has been requested by the RRC and indicates the amount of data in number of bytes that is available for transmission and retransmission in RLC and for transmission in the segmentation entities of the MAC-i/is entity.

Figure 3:
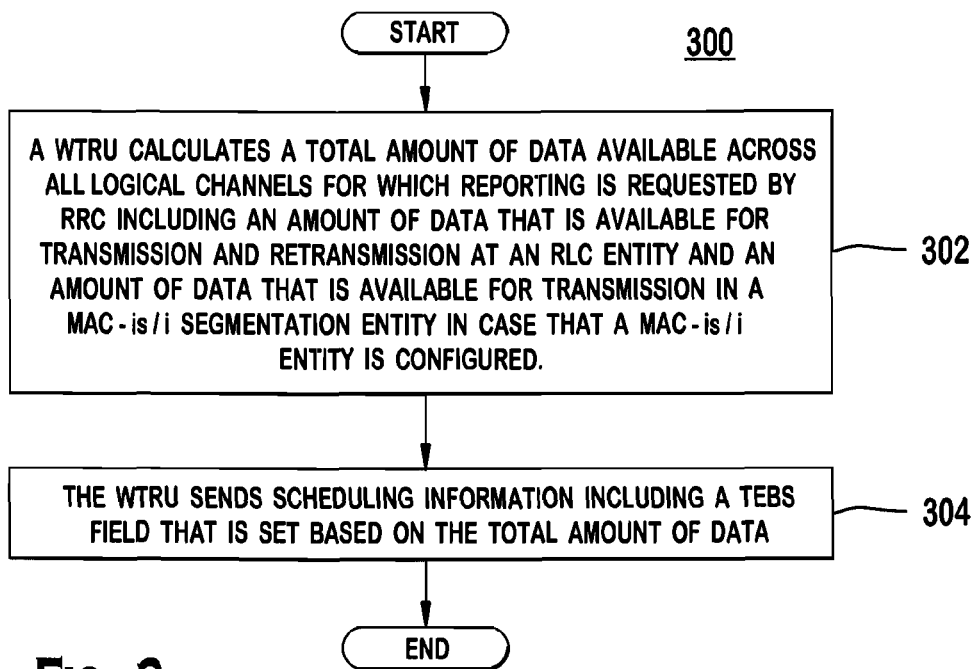
FIG. 3 is a flow diagram of an example process of reporting TEBS in accordance with a first embodiment.

FIG. 3 is a flow diagram of an example process 300 of reporting TEBS in accordance with a first embodiment. A WTRU calculates a total amount of data available across all logical channels for which reporting is requested by RRC (step 302). In calculating the total amount of data, the WTRU includes an amount of data that is available for transmission and retransmission at an RLC entity and an amount of data that is available for transmission in a MAC-i/is segmentation entity in case that a MAC-i/is entity is configured. The WTRU then sends scheduling information including a TEBS field that is set based on the total amount of data (step 304).

The segments that are stored in the MAC-i/is segmentation entity that belongs to a logical channel for which a non-scheduled grant is configured may not be included in the total amount of data. In addition, the segments that are stored in the MAC-i/is segmentation entity that belongs to a logical channel that the RRC has restricted applicability may not be included in the total amount of data. When MAC is connected to an acknowledged mode (AM) RLC entity, control PDUs to be transmitted and RLC PDUs outside the RLC Tx window may also be included in the TEBS. RLC PDUs that have been transmitted but not negatively acknowledged by the peer entity may not be included in the TEBS.

The first embodiment may be applied to highest priority logical channel buffer status (HLBS) calculation as well. The HLBS may indicate the amount of data available from the logical channel identified by the highest priority logical channel identity (HLID) field, including the amount of data that is available for transmission and retransmission in RLC and for transmission in the segmentation entities of the MAC-i/is entities, relative to the highest value of the buffer size range reported by TEBS or relative to a pre-determined number of bytes, (e.g., 50,000 bytes), depending on the TEBS index.

Figure 4:
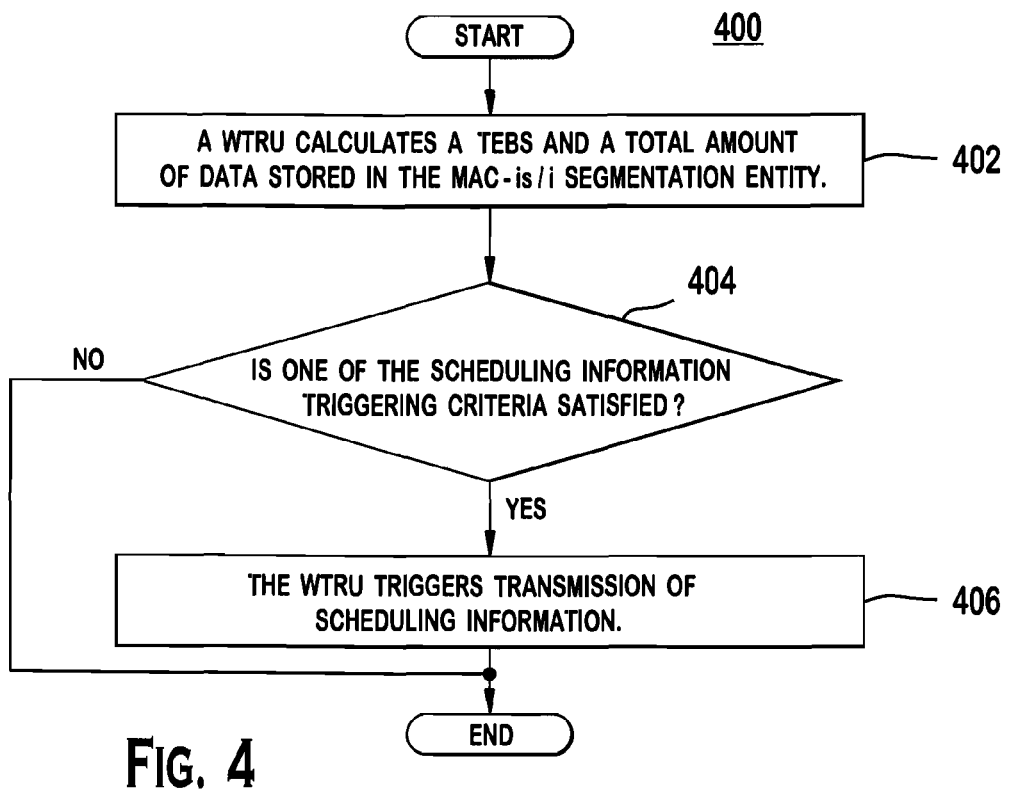
FIG. 4 is a flow diagram of an example process of reporting a buffer status and sending scheduling information in accordance with a second embodiment.

In accordance with a second embodiment, the definition of the TEBS is not modified, but the scheduling information triggering criteria is modified. FIG. 4 is a flow diagram of an example process 400 of reporting a buffer status and sending scheduling information in accordance with a second embodiment. A WTRU calculates a TEBS and a total amount of data stored in the MAC-i/is segmentation entity (step 402). The MAC-i/is segmentation entity buffer status is referred to as "total MAC buffer status" (TMBS). The TMBS identifies the total amount of data in bytes available across all logical channels for which reporting has been requested by the RRC that is available for transmission in the segmentation entities of the MAC-i/is entity.

The segments that are stored in the segmentation entity of the MAC-i/is that belongs to a logical channel for which a non-scheduled grant is configured may not be taken into account when calculating the TMBS value. In addition, the segments that are stored in the segmentation entity of the MAC-i/is that belong to a logical channel which the RRC has restricted applicability may not be counted in the TMBS calculation.

The WTRU determines whether a modified scheduling information triggering criterion is satisfied (step 404). If so, the WTRU triggers transmission of scheduling information (step 406). If not, scheduling information reporting is not triggered.

The scheduling information may be triggered if at least one of the following conditions is satisfied: (1) The serving grant is equal to "zero" or all HARQ processes are deactivated, and the TEBS becomes larger than zero or the TMBS is larger than zero (or alternatively larger than a configured threshold); (2) The serving grant is equal to "zero" or all HARQ processes are deactivated, and the sum of TEBS and TMBS is larger than zero (or alternatively larger than a configured threshold); (3) The serving grant is equal to "zero" or all HARQ processes are deactivated, and TEBS is zero and TMBS is larger than zero; or (4) Periodic triggering. The scheduling information may be triggered if the serving grant is zero or all HARQ processes are deactivated, and TEBS or TMBS is larger than zero (or alternatively TMBS is larger than a threshold or the sum of TEBS and TMBS is larger than a threshold). In this case, T_SING may be used as a timer to determine the periodicity of the triggering. The scheduling information may also be triggered if the serving grant is non-zero and at lease one HARQ process is activated and TEBS is zero but TMBS is non-zero.

In accordance with the current 3GPP specification, scheduling information shall not be transmitted if the TEBS is zero, even if it was triggered by one of the configured triggering mechanisms. In accordance with the second embodiment, this rule is modified such that the scheduling information shall not be transmitted if both TEBS and TMBS are zero (alternatively the sum of TEBS and TMBS are zero), even if it was triggered by one of the configured triggering mechanisms.

When one of the above scheduling information triggering criteria is satisfied and TEBS is zero but the TMBS is non-zero, the TMBS value may be reported in the TEBS field of the scheduling information. Alternatively, TEBS zero may be allowed to be reported but a new field may be added to the scheduling information to indicate that data is available in the MAC segmentation entity. The new field may be one bit, just indicating that some data is available in the MAC entity, or a few bits to indicate an index to a TMBS value range.

Alternatively, TEBS zero may be allowed to be reported but one of the fields may be reinterpreted to indicate the TMBS value. For example, the HLBS field may be used to indicate the TMBS. The network may be configured to know that if TEBS is zero and the HLBS field is non-zero, it implies that the HLBS field contains the TMBS value. Alternatively, TEBS zero may be signaled and a happy bit may be set to "unhappy" if TMBS is larger than zero. Alternatively, TEBS zero may be reported but the HLID field may be reinterpreted to indicate the TMBS value.

The same concept may be applied to the triggering of the happy bit. The condition for triggering the happy bit is modified such that the happy bit is set to "unhappy" if the sum of TEBS and TMBS would require more than Happy_bit_delay condition ms to be transmitted with the current serving grant× the ratio of active HARQ processes to the total number of HARQ processes.

Regardless of whether TEBS is equal to zero or not, the WTRU may always report the sum of TEBS and TMBS within the "TEBS" field of the scheduling information, whenever MAC-i/is is configured. If this scheme is used, then the name of the "TEBS" field within the scheduling information may be replaced with a different name, (e.g., total E-DCH buffer status with segmentation (TEBSS)), to avoid confusion with the conventional definition of TEBS.

In accordance with a third embodiment, data stored in the segmentation entity of the MAC-i/is entity may be discarded under certain conditions to avoid wasting resources attempting to transmit the data. In case that a WTRU has a stored segment in the MAC entity which cannot be transmitted for a certain period of time due to limited grant, channel priority, or the like, if a pre-configured time elapses between the transmission of the latest segment and the stored segment, it would be beneficial to discard this segment since either its transmission delay would be too large to be of use to higher layers, or the RLC PDU including this segment would be retransmitted in its entirety.

Data in the segmentation entity may be discarded if the serving grant is equal to "zero" or all HARQ processes are de-activated. In this case the data may be discarded for all logical channels, or alternatively for all logical channels mapped to a scheduled flow.

Data in the segmentation entity may also be discarded if a discard timer expired. The discard timer may be specific to a certain logical channel. In this case the discard timer may be started upon arrival of data from a certain PDU in the segmentation entity for this logical channel, and stopped when all data from this PDU is transmitted. When the discard timer expires the data from only the concerned logical channel is discarded. Alternatively, the discard timer may be unique across all logical channels. In this case the discard timer may be started when the serving grant is equal to "zero" or when all HARQ processes are de-activated, and stopped when the serving grant becomes higher than zero. When the discard timer expires the data may be discarded for all logical channels, or alternatively for all logical channels mapped to a scheduled flow.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method comprising:
   determining, by a wireless transmit/receive unit (WTRU), an amount of data available for transmission across one or more logical channels, wherein the data includes data available for transmission in a medium access control (MAC) segmentation entity;
   generating, by a wireless transmit/receive unit (WTRU), scheduling information in a MAC protocol data unit (PDU), wherein the scheduling information includes a total E-DCH buffer status (TEBS) field identifying the determined amount of data available for transmission across the one or more logical channels in a radio link control (RLC) layer and the data available for transmission in the MAC segmentation entity; and
   transmitting a message including the scheduling information from the WTRU to a serving Node-B, wherein the message requests enhanced dedicated channel (E-DCH) resources.

2. The method of claim 1 wherein the determined amount of data available for transmission across one or more logical channels does not include data associated with a non-scheduled grant.

3. The method of claim 1 wherein the TEBS field indicates the amount of data available for transmission and retransmission.

4. The method of claim 1 wherein the scheduling information includes a highest priority logical channel buffer status (HLBS) field.

5. The method of claim 4 wherein the HLBS field indicates the amount of data available from a logical channel identified by a highest priority logical channel identity (HLID) field.

6. The method of claim 1 wherein the message is not transmitted if the TEBS field is zero.

7. The method of claim 1 wherein the TEBS field includes one or more control PDUs to be transmitted.

8. The method of claim 1 wherein the TEBS field includes one or more RLC PDUs outside of an RLC transmission window.

9. The method of claim 8 wherein the RLC PDUs have been transmitted and negatively acknowledged by a peer entity.

10. A wireless transmit/receive unit (WTRU) comprising:
    a processor configured to determine an amount of data available for transmission across one or more logical channels, wherein the data includes data available for transmission in a medium access control (MAC) segmentation entity;
    the processor further configured to generate scheduling information in a MAC protocol data unit (PDU), wherein the scheduling information includes a total E-DCH buffer status (TEBS) field identifying the determined amount of data available for transmission across the one or more logical channels in a radio link control (RLC) layer and the data available for transmission in the MAC segmentation entity; and
    a transmitter configured to transmit a message including the scheduling information from the WTRU to a serving Node-B, wherein the message requests enhanced dedicated channel (E-DCH) resources.

11. The WTRU of claim 10 wherein the determined amount of data available for transmission across one or more logical channels does not include data associated with a non-scheduled grant.

12. The WTRU of claim 10 wherein the TEBS field indicates the amount of data available for transmission and retransmission.

13. The WTRU of claim 10 wherein the scheduling information includes a highest priority logical channel buffer status (HLBS) field.

14. The WTRU of claim 13 wherein the HLBS field indicates the amount of data available from a logical channel identified by a highest priority logical channel identity (HLID) field.

15. The WTRU of claim 10 wherein the message is not transmitted if the TEBS field is zero.

16. The WTRU of claim 10 wherein the TEBS field includes one or more control PDUs to be transmitted.

17. The WTRU of claim 10 wherein the TEBS field includes one or more RLC PDUs outside of an RLC transmission window.

18. The WTRU of claim 17 wherein the RLC PDUs have been transmitted and negatively acknowledged by a peer entity.

* * * * *